Patented Sept. 5, 1950

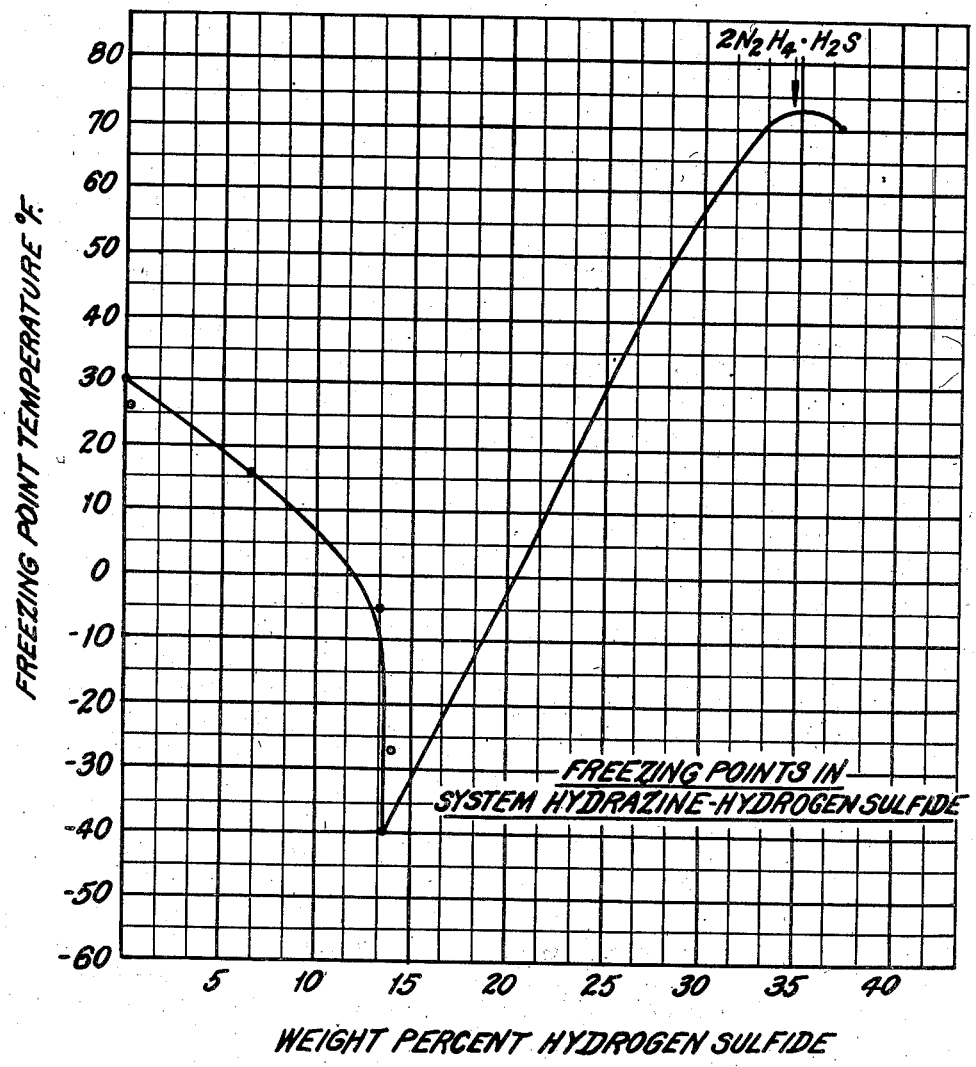

2,521,026

UNITED STATES PATENT OFFICE 2,521,026

HYDRAZINE COMPOSITIONS AND METHOD OF PRODUCING THEM

Ernest Solomon, Nutley, N. J., assignor to The M. W. Kellogg Company, Jersey City, N. J., a corporation of Delaware Application August 22, 1947, Serial No. 770,029

4 Claims. (Cl. 44—64)

This invention relates to hydrazine compositions and relates more particularly to hydrazine compositions having low freezing points and the method of producing them. Still more particularly the invention relates to new compositions of matter having the characteristics of hydrazine and the method of producing them, wherein the freezing points of these compositions are sufficiently low to permit their utilization as rocket propellants.

Heretofore in the use of hydrazine as a rocket propellant or as a combustible motor fuel at high altitudes, it has been the practice to add water as a diluent to hydrazine in order to obtain hydrazine-water mixtures having lower freezing points than pure hydrazine. For example, pure hydrazine has a freezing point of approximately 34.5° F. and hence will solidify at high altitudes where temperatures lower than such freezing point are encountered, rendering ineffectual its use as a combustion fuel under such conditions. However it has been found upon proper dilution of hydrazine with water, such as a hydrazine-water mixture containing approximately 26 weight percent water, there is thus obtained a mixture having the characteristics of hydrazine and whose freezing point is approximately —40° F. Similarly, by varying the weight percent of water present, hydrazine-water mixtures having higher or lower freezing points may be obtained. While such mixtures have heretofore represented the best obtainable hydrazine propellants, which function satisfactorily under the aforementioned atmospheric conditions of low temperature, nevertheless these mixtures also carry the obvious burden of a relatively large percent by weight of non-combustible material as a diluent, or freezing point depressant.

In seeking a substitute for water as a freezing point depressant for hydrazine to be used as one component of rocket propellants, it is therefore desirable that the depressant or additive have a relatively high heat of combustion so that it is no longer a non-contributing component in the combustion process, as is water in hydrazine-water mixtures. In addition it is further desirable that the relative quantities of additive required be less than the quantities of water otherwise required to effect a similar lowering in the freezing points of the resulting hydrazine compositions, thereby effecting proportionate reductions in space normally required for fuel storage and increasing the power obtainable per unit of fuel.

I have found that by admixing hydrazine with hydrogen sulfide or hydrogen cyanide in varying proportions, as more fully hereinafter described, there are obtained new compositions of matter comprising solutions of stable salts of hydrazine possessing the characteristics of hydrazine and surpassing the aforementioned hydrazine-water mixtures, in that the freezing point of hydrazine may be sufficiently lowered to make its use as a propellant highly attractive. Furthermore, as hereinafter described, I have found that the use of hydrogen sulfide or hydrogen cyanide with hydrazine as a freezing point depressant, has additional value in that hydrogen sulfide and hydrogen cyanide comprise combustible materials producing an additive effect when used in admixture with hydrazine, which is not obtained when water is used as a diluent. In addition I have also found that the relative quantities of either hydrogen sulfide or hydrogen cyanide required in the aforementioned hydrazine mixtures are appreciably less than the quantities of water otherwise required to produce a corresponding lowering of the freezing point of hydrazine when water is used as a freezing point depressant or diluent in hydrazine-water mixtures, and hence an appreciable reduction in space normally required for fuel storage is obtained and the power obtained per unit of fuel is also increased.

It is therefore an object of the invention to provide for the preparation of hydrazine compositions having low freezing points.

Another object of the invention is to provide a method for producing compositions of matter having the characteristics of hydrazine, wherein the freezing points of these compositions are sufficiently low to permit their utilization as rocket propellants.

Still another object of the invention is to provide for a freezing point-depressant for hydrazine or hydrazine mixtures, wherein the depressant comprises a combustible additive.

A further object of the invention is to provide for the efficient and economical preparation of freezing point depressants for hydrazine or hydrazine mixtures.

Other objects and advantages inherent in the invention will become apparent from the following more detailed description and the accompanying drawing, of which the single figure is a graphical representation of data showing the freezing points obtained with varying hydrazine mixtures using depressants of the type hereinbefore indicated.

In accordance with the invention, I may admix pure hydrazine, hydrazine hydrate or hydrazine-water mixtures which are hereinafter referred to as "hydrazine" for convenience, with hydrogen sulfide or hydrogen cyanide to produce a composition having a freezing point which is lower than the freezing point of pure hydrazine or hydrazine-water mixtures. The composition thus produced comprises a solution of a stable salt of hydrazine in excess hydrazine or hydrazine and water, possessing the characteristics of pure hydrazine insofar as its value as a rocket fuel or combustible motor fuel is concerned. While varying proportions of either hydrogen sulfide or hydrogen cyanide may be admixed with hydrazine, as described above, to obtain a corresponding lowering of the freezing point of hydrazine in the salt composition thereby produced, I have found it highly desirable to prepare such compositions which comprise hydrazine and between about 10 percent and about 20 percent by weight of hydrogen sulfide or hydrogen cyanide as diluents or freezing point depressants, although other proportions of hydrazine and the particular additive selected, may be also advantageously prepared.

For example, as shown in the drawing hereinafter described, compositions comprising hydrazine and between about 10% and about 25% of hydrogen sulfide may be prepared, which are effective to depress the freezing point of the motor fuel to below that of hydrazine.

The following specific example will serve to illustrate, but is not intended in any way to limit, the present invention.

Varying mixtures of hydrogen sulfide and liquid hydrazine containing small quantities of water, as shown in the following table, were prepared by bubbling industrial hydrogen sulfide into the hydrazine. Since the reaction of hydrogen sulfide and hydrazine is exothermic, the reaction mixture was not permitted to exceed approximately 110° F. The solutions thus obtained were found to be clear and of a yellow or yellow-green appearance. The individual freezing points of these solutions were then noted as indicated in the table.

Table

| Weight per cent | | | Freezing Point, °F. |
|---|---|---|---|
| $H_2S$ | $N_2H_4$ | $H_2O$ | |
| 0.0 | 96.5 | 3.5 | +30 |
| 0.54 | 96.0 | 3.5 | +26 |
| 6.2 | 90.2 | 3.2 | +16 |
| 13.3 | 83.8 | 2.9 | −5 |
| 13.4 | 83.7 | 2.9 | −40 |
| 13.7 | 83.4 | 2.9 | −27 |
| 37.0 | 60.9 | 2.1 | +70 |

By referring to the table, it will be noted that the quantities of water present in the hydrazine-hydrogen sulfide mixtures vary between about 2.1 to 3.5 percent by weight. The presence of these relatively small quantities of water do not appreciably affect the ease with which the respective freezing points of the hydrazine mixtures may be lowered. Hence it will be apparent that either pure hydrazine, hydrazine hydrate, or other hydrazine-water mixtures may be brought into admixture with hydrogen sulfide, to produce a lowering of the freezing point of hydrazine present. However, where proportionately large quantities of water are present, there will be obtained a corresponding reduction in the heat of combustion of the hydrazine-hydrogen sulfide mixture, as well as proportionate variations in the freezing points of the respective mixtures.

In order to further demonstrate the freezing point characteristics of the varying hydrazine-hydrogen sulfide compositions that may be prepared in accordance with the aforementioned process, the single figure in the accompanying drawing shows a freezing-point curve plotted from the data obtained. This curve was plotted for each of the hydrazine-hydrogen sulfide mixtures as shown in the table, with weight percent of hydrogen sulfide as abscissae, and freezing point temperature in °F. as ordinates.

Referring to the drawing, it will be apparent that the eutectic mixture in the hydrazine-hydrogen sulfide system contains approximately 13.4 weight percent of hydrogen sulfide and freezes at approximately −40° F. Hence it will be seen that the percent by weight of hydrogen sulfide present in this mixture is considerably less than the 26 weight percent of water present in a hydrazine-water mixture whose freezing point is also approximately −40° F. I have found that the aforementioned hydrazine-hydrogen sulfide eutectic mixture has a liquid density of approximately 1.1 gm./ml., with a temperature coefficient of about 0.0003 gm./ml./°F. The viscosity of this mixture is of the order of 3 stokes at −20° F., and about 0.3 stokes at +75° F.

It will also be noted that from 0 to 13.4 weight percent of hydrogen sulfide, the freezing point of the hydrazine is depressed by the presence of a hydrazine-hydrogen sulfide salt which was found to be $2N_2H_4 \cdot H_2S$. From 13.4 to 34.7 weight percent, the freezing point of the composition $2N_2H_4 \cdot H_2S$ is depressed by the hydrazine. The minimum freezing point is reached at a eutectic mixture comprising $2N_2H_4 \cdot H_2S$ and hydrazine.

While in the aforementioned example there has been described a method for lowering the freezing point of hydrazine by admixing hydrazine with hydrogen sulfide, I have also found that similar results and advantages, as hereinbefore indicated, may be obtained when hydrogen cyanide is substituted for hydrogen sulfide in the aforementioned hydrazine mixtures. In this respect, I have found that in employing a freezing point depressant, other than water for hydrazine, it is desirable that the depressant have a low molecular weight, that it be amphoteric or possess slightly acidic properties so that a stable salt may be formed with hydrazine, which has basic characteristics, and that the depressant preferably be a dibasic acid. Hence, while it will be apparent that hydrogen cyanide resembles hydrogen sulfide in that both compounds have relatively molecular weights and are weak acids, other compounds, in addition to those mentioned above, possessing the aforementioned characteristics, individually or in admixture, may be readily substituted to produce stable hydrazine salts of relatively low freezing points.

In addition, while a particular embodiment of the invention has been described for purposes of illustration, it should be understood that various modifications and adaptations thereof, which will be obvious to one skilled in the art, may be made within the spirit of the invention as set forth in the appended claims. It will also be understood that the term "hydrazine" in the appended claims refers to pure hydrazine, hydrazine hydrate or hydrazine-water mixtures.

Having thus described my invention, what I claim and desire to secure by Letters Patent is:

1. A motor fuel consisting essentially of hydrazine and between about 10% and about 20% of at least one material selected from the group consisting of hydrogen sulfide and hydrogen cyanide and having a freezing point which is lower than that of hydrazine.

2. A motor fuel consisting essentially of hydrazine and between about 10% and about 20% of hydrogen sulfide and having a freezing point which is lower than that of hydrazine.

3. A motor fuel consisting essentially of hydrazine and between about 10% and about 20% of hydrogen cyanide and having a freezing point which is lower than that of hydrazine.

4. A motor fuel consisting essentially of hydrazine and an amount between about 10% and about 25% of hydrogen sulfide, said amount being effective to depress the freezing point of said motor fuel to below that of hydrazine.

ERNEST SOLOMON.

REFERENCES CITED

The following references are of record in the file of this patent:

Mellor: "Comprehensive Treatise on Inorganic and Theoretical Chemistry" (1930), vol. 10, pp. 135 and 136.